United States Patent [19]
Place

[11] Patent Number: 6,035,957
[45] Date of Patent: Mar. 14, 2000

[54] POWER STEERING CONTROL VALVE BALANCING

[75] Inventor: Jack L. Place, Greenville, Tenn.

[73] Assignee: TRW Inc., Lyndhurst, Ohio

[21] Appl. No.: 08/935,284

[22] Filed: Sep. 22, 1997

[51] Int. Cl.⁷ ...................................................... B62D 5/22
[52] U.S. Cl. ....................... 180/426; 74/388 PS; 180/428
[58] Field of Search ..................... 180/425, 428, 180/426, 441, 417; 74/388 PS; 411/307, 263

[56] References Cited

U.S. PATENT DOCUMENTS

| | | | |
|---|---|---|---|
| 3,296,939 | 1/1967 | Eddy | 74/388 PS |
| 4,063,490 | 12/1977 | Duffy . | |
| 4,742,883 | 5/1988 | Duffy . | |
| 4,924,696 | 5/1990 | Schroeder et al. | 180/428 |
| 5,655,621 | 8/1997 | Birsching | 180/428 |

*Primary Examiner*—Anne Marie Boehler
*Attorney, Agent, or Firm*—Tarolli, Sundheim, Covell, Tummino & Szabo L.L.P.

[57] ABSTRACT

A power rack and pinion steering gear (10) includes a rack (66), a pinion (54) meshing with the rack, and a power steering hydraulic motor (31) for moving the rack. The steering gear (10) includes first and second relatively rotatable valve members (40, 42) which control hydraulic fluid pressure in the hydraulic motor (31) and thereby control rack movement. A rotatable input shaft (50) is connected with the first valve part (40), the first valve part rotating upon rotation of the input shaft. A torsion bar (51) is connected between and acts between the input shaft (50) and the pinion (54). The steering gear (10) includes means, such as a rotatable fastener (56), for connecting the pinion (54) to the second valve (42) part to cause the pinion and the second valve part to rotate together. The fastener (56) is operable to rotate the second valve part (42) relative to the pinion (54) and the first valve part (40) while the torsion bar (51) is connected to the input shaft (50).

5 Claims, 3 Drawing Sheets

POWER STEERING CONTROL VALVE BALANCING

BACKGROUND OF THE INVENTION

The present invention relates to a hydraulic rack and pinion power steering system including a control valve having an inner valve member (valve core) which is coaxial with and rotatable relative to an outer valve member (valve sleeve).

In this type of steering system, the inner valve member is formed on a part of a cylindrical input shaft which is connected for rotation with the vehicle steering wheel. The outer valve member is connected for rotation with a follow-up member in the form of a pinion. The pinion is in meshing engagement with the toothed portion of a rack. The rack is drivingly connected with a piston-cylinder type power steering motor and steerable vehicle wheels.

To effect actuation of the power steering motor to turn the steerable vehicle wheels, the inner valve member is rotated relative to the outer valve member, from a neutral condition, for a few degrees against the bias of a torsion bar. The torsion bar is press fitted at one end to the pinion and at the other end is connected by a pinned connection to the input shaft. When the steering wheel is rotated, relative rotation between the inner and outer valve members ports fluid under pressure to one side or the other of the steering motor to effect steering movement of the steerable vehicle wheels.

It is important that the control valve be balanced, so that the same amount of steering assist is generated when the inner valve member is rotated by the same angular amount in either direction from the neutral condition. Typically, the control valve is balanced prior to the torsion bar being pinned to the inner valve member. The operation of pinning the torsion bar to the input shaft, after the valve has been balanced, may cause the control valve to become unbalanced.

SUMMARY OF THE INVENTION

The present invention is a power rack and pinion steering gear comprising a rack, a pinion meshing with the rack, and a power steering hydraulic motor for moving the rack. The steering gear includes first and second relatively rotatable valve members which control hydraulic fluid pressure in the hydraulic motor and thereby control rack movement. A rotatable input shaft is connected with the first valve part, the first valve part rotating upon rotation of the input shaft. A torsion bar is connected between and acts between the input shaft and the pinion. The steering gear includes means for connecting the pinion to the second valve part to cause the pinion and the second valve part to rotate together. The means for connecting is operable to rotate the second valve part relative to the pinion and the first valve part while the torsion bar is connected to the input shaft.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
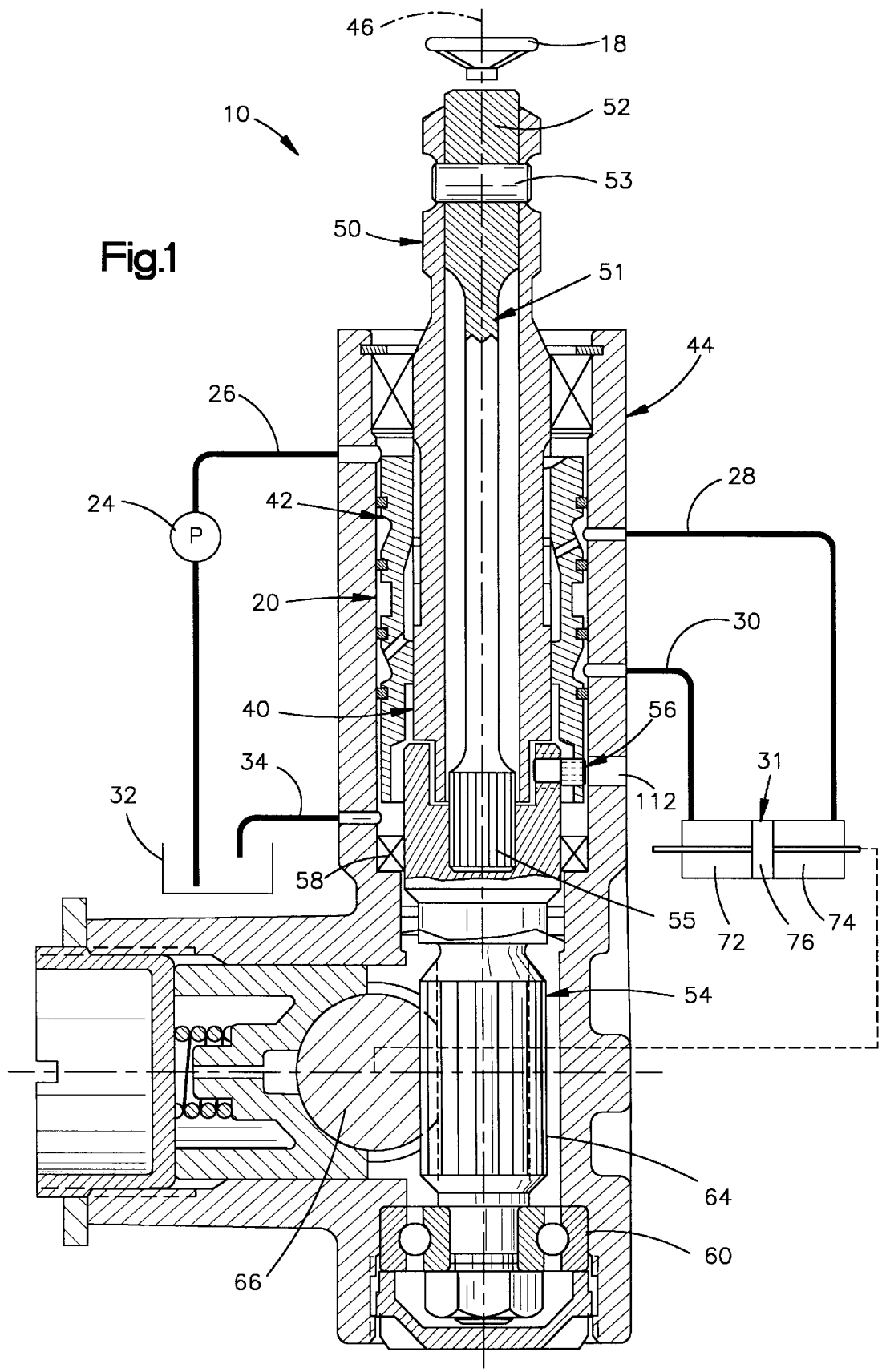
FIG. 1 is a schematic view partially in section of a vehicle power steering system including a control valve in accordance with the present invention.

The present invention relates to a hydraulic rack and pinion power steering system including a control valve having an inner valve member (valve core) which is coaxial with and rotatable relative to an outer valve member (valve sleeve). The present invention is applicable to various steering system constructions. As representative of the present invention, FIG. 1 illustrates a vehicle hydraulic power assist steering system 10.

The vehicle power steering system 10 (FIG. 1) is operable to turn steerable vehicle wheels (not shown) upon rotation of a steering wheel 18 by an operator of the vehicle. Rotation of the steering wheel 18 actuates a hydraulic power steering directional control valve 20 to port hydraulic fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels in one or another direction. Simultaneously, fluid is conducted from the motor 31 to a reservoir 32 through the other one of the motor conduits 28 or 30, the control valve 20, and a return conduit 34.

The control valve 20 includes an inner rotary valve member or valve core 40, and an outer rotary valve member or valve sleeve 42. The outer valve member 42 encloses the inner valve member 40. The inner valve member 40 and outer valve member 42 are rotatable relative to (a) each other, and (b) a housing 44, about a common central axis 46 of the steering gear 10. The inner valve member 40 is formed on a part of a cylindrical input shaft member or valve stem 50 which is connected for rotation with the steering wheel 18.

The outer valve member 42 is connected with a follow-up member or pinion 54 by a fastener in the form of a hitch pin 56, described below in detail. The pinion 54 is rotatably supported in the housing 44 by bearings 58 and 60. The pinion 54 has a pinion gear portion 64 which is in meshing engagement with the toothed portion of a rack 66. The rack 66 is drivingly connected with the power steering motor 31 and steerable vehicle wheels.

The inner valve member 40 and the outer valve member 42 are drivingly interconnected through a resilient torsion bar 51 and by a mechanical dog and tine drive mechanism (not shown) acting between the pinion and the input shaft. An outer end 52 of the torsion bar 51 is secured to the input shaft with a pin 53. A splined inner end 55 of the torsion bar 51 is press fitted into a recess in the pinion 54. The mechanical drive mechanism allows limited rotational movement of the input member 50 and the inner valve member 40 relative to the pinion 54 when the torque in the pinion gear portion 64 required to displace the rack 66 exceeds the torque required to deflect the torsion bar 51. Hence, the input member 50 can be displaced by a few degrees relative to the pinion 54, with such displacement occurring as twisting of the torsion bar 51.

The outer valve member 42 is fixed against rotation relative to the pinion 54 by the hitch pin 56. Accordingly, the input member 50 and the inner valve member 40 can be rotated slightly with respect to the pinion 54 and the outer valve member 42. The amount of relative rotation, within the limits of the clearance of the mechanical drive mechanism, is proportional to the torque in the torsion bar 51 and other elements of the steering drive line, such as the pinion 54 and the input member 50. This relative rotation between the input member 50 and the outer valve member 42 is used to control the flow of hydraulic fluid from the pump 24 to the steering motor 31.

The pump 24 is a fixed positive displacement pump. The control valve 20 (FIG. 1) is of the open-center type. Therefore, when the control valve 20 is in an initial or unactuated neutral condition, that is, when there is no steering demand, the fluid from the pump 24 is conducted through the motor conduits 28 and 30 to motor cylinder chambers 72 and 74 on opposite sides of a piston 76 which is connected to the rack 66 in the power steering motor 31. Also, fluid flow from the pump 24 is directed by the control valve 20 to the return conduit 34 and reservoir 32. The pressure required to circulate the hydraulic fluid through the steering mechanism 10 to the reservoir 32 is relatively low because there is no restriction of flow. Hence, fluid is circulated at low pressure, by the pump 24 through the valve 20 and back to the reservoir 32.

Upon rotation of the steering wheel 18 and rotation of the valve stem 50, the inner valve member 40, if there is sufficient resistance to displacement of the rack 66 caused by frictional engagement of the vehicle tires with the ground or road surface, is rotated about the axis 46 relative to the outer valve member 42. This relative rotation moves valving edges on the inner valve member 40 relative to valving edges on the sleeve 42, and creates, in a known manner, a demand for high pressure fluid from the pump 24, and directs high pressure fluid from the pump 24 to one of the motor conduits 28 or 30 and directs fluid from the other motor conduit to the reservoir 32.

As the power steering motor 31 operates, the rack 66, which is also the rod for the motor 31, rotates the pinion 54. This rotation of the pinion 54 together with the torque from the torsion bar 51 rotates the outer valve member 42 relative to the inner valve member 40 tending to return the valve 20 to its open center, neutral position. When the power steering motor 31 is operated to turn the steerable vehicle wheels to an extent corresponding to the extent of rotation of the inner valve member 40, the feedback of the rotation of the pinion 54 caused by movement of the rack 66 rotates the pinion 54 through a distance sufficient to move the outer valve member 42 to its initial position remove to the inner valve member. When this occurs, the fluid pressure in the motor cylinder chambers 72 and 74 equalizes and the motor 31 stops operating.

Figure 2:
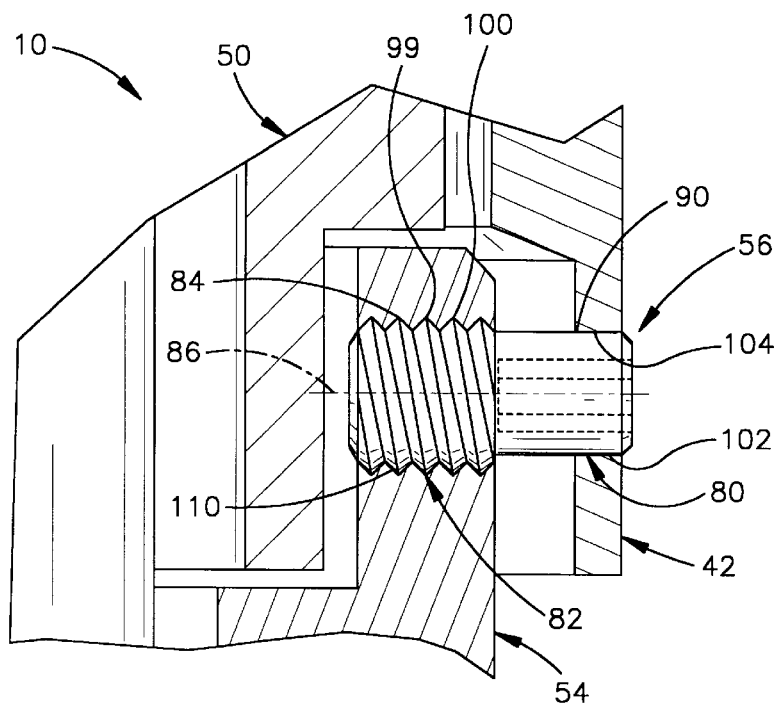
FIG. 2 is an enlarged fragmentary sectional view of a portion of FIG. 1 showing a fastener extending between and interconnecting a valve sleeve and a pinion.

The hitch pin 56, which secures the valve sleeve 42 to the pinion 54 (FIGS. 2, 5 and 6) is also used for balancing the control valve 20 so that the same amount of steering assist is generated when the control valve is operated through the same angular extent in either direction from the neutral condition. The balancing of the control valve 20 can be effected after the torsion bar 51 is pinned to the input shaft 50, in a manner as described below.

The hitch pin 56 (FIGS. 3 and 4) has a head portion 80 and a body portion 82. The body portion 82 of the hitch pin 56 has an external thread convolution 84 centered on a thread axis 86 of the hitch pin. The body portion 82 of the hitch pin 56 has an outer circumference 88.

Figures 3, 4:
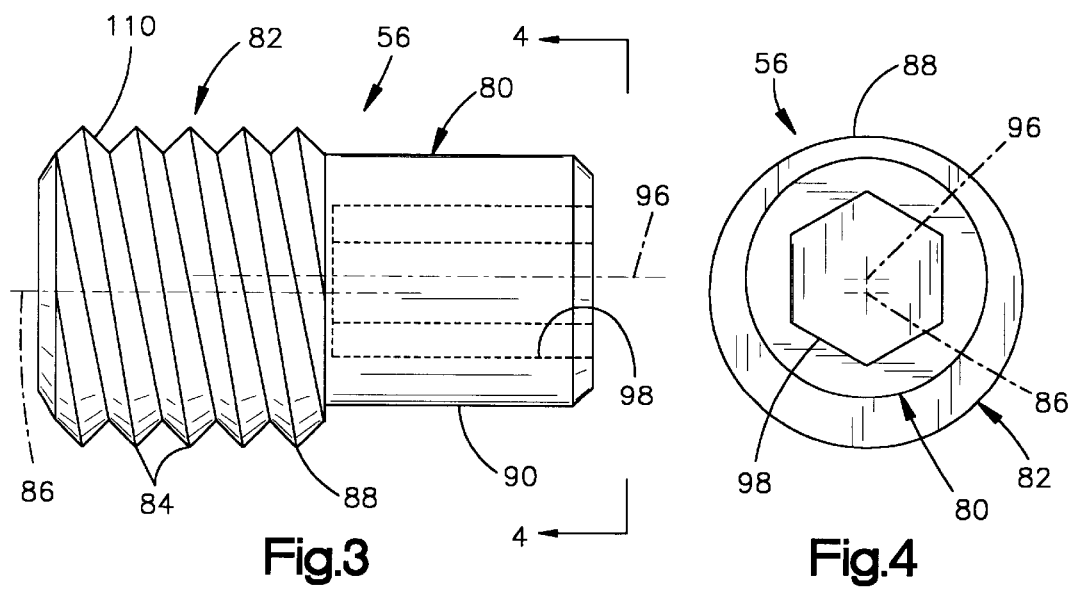
FIG. 3 is an elevational view of the fastener of FIG. 2.
FIG. 4 is an end view of the fastener of FIG. 2 taken along lines 4—4 of FIG. 3.

The head portion 80 of the hitch pin 56 has a generally cylindrical configuration including a cylindrical outer side surface 90 centered on a head axis 96 of the hitch pin. The head axis 96 of the hitch pin 56 is not collinear with the thread axis 86 of the hitch pin. Specifically, the head axis 96 extends parallel to the thread axis 86, but is offset radially from the thread axis by a small amount, as can be seen in FIGS. 3 and 4. Thus, the head portion 80 of the hitch pin 56 is offset from or eccentric to the body portion 82 of the hitch pin. A hex drive socket 98 is formed in the head portion 80, centered on the head axis 96 of the hitch pin 56.

During assembly of the steering gear 10, the end 55 of the torsion bar 51 is press fitted into the pinion 54. Also, the hitch pin 56 is screwed into the pinion 54 so that the body portion 82 of the hitch pin engages threads 99 formed in a bore 100 in the pinion. The head portion 80 of the hitch pin 56 protrudes from the pinion 54.

Next, the valve sleeve 42 is slid axially over the pinion 54 and the hitch pin 56. The valve sleeve 42 has a cylindrical passage 102 extending radially through the wall of the valve sleeve. The passage 102 is defined by a cylindrical surface 104. The wall of the valve sleeve 42, at the location of the passage 102, is thin enough that when the valve sleeve is not centered radially on the pinion, the valve sleeve can be moved axially over the protruding head portion 80 of the hitch pin 56 to a position in which the head portion of the hitch pin can be received in the passage 102 in the valve sleeve. The cylindrical outer surface 90 of the head portion 80 of the hitch pin 56 engages the surface 104 which defines the passage 102 in the valve sleeve 42.

The valve sleeve 42 is then centered radially with respect to the pinion 54. The input shaft 50 is then slid axially over the torsion bar 51 and rotated so that the control valve 20 is balanced as well as possible. The end 52 of the torsion bar and the input shaft are then drilled through and the pin 53 is inserted into the resulting opening, to secure the end of the torsion bar for rotation with the input shaft.

The threads 84 on the body portion 82 of the hitch pin 56 have a pitch slightly different from the pitch of the threads 99 in the pinion 54. As a result, when the hitch pin 56 is screwed into the pinion 54, the threads 84 on the body portion 82 of the hitch pin 56 interlock with the threads 99 on the pinion 54 to restrict severely rotational movement of the hitch pin relative to the pinion. In addition, a thread locking material 110, such as an adhesive, is placed on the threads 84 of the hitch pin 56 just prior to insertion of the hitch pin into the pinion 54.

To complete the balancing of the control valve 20, the hitch pin 56 is driven for rotation, through a pluggable access port 112, so that the threaded body portion 82 of the hitch pin rotates about the thread axis 86 within the bore 100 in the pinion 54. The head portion 80 of the hitch pin 56 rotates with the body portion 82. Because the head portion 80 of the hitch pin 56 is eccentric from the body portion 82, the head portion 80 orbits slightly about the thread axis 86 during rotation of the hitch pin.

Because of the engagement of the cylindrical outer surface 90 of the head portion 80 of the hitch pin 56 with the cylindrical surface 104 of the valve sleeve 42, the slight orbital movement of the head portion of the hitch pin causes the portion of the valve sleeve which receives the hitch pin head portion to follow the moving head portion of the hitch pin. The valve sleeve 42 thus moves slightly axially but primarily circumferentially about the axis 46 of the steering gear 10, relative to the pinion 54.

The slight rotational movement of the valve sleeve 42 relative to the pinion 54, circumferentially about the axis 46, causes the grooves and lands on the inner periphery of the valve sleeve to move circumferentially relative to the grooves and lands on the outer periphery of the valve core 40 which is secured to the pinion 54 by the torsion bar 51. This relative movement between the valve sleeve 42 and the valve core 40 changes the balance of the control valve 20. By noting the changes in fluid pressures resulting from this relative movement of the parts 40 and 42 of the control valve 20, the valve sleeve can be positioned relative to the valve core, by appropriate rotation of the hitch pin 56, to set the final balance of the control valve as desired.

The slight axial movement of the valve sleeve 42, during rotation of the hitch pin 56, is accommodated by the overlapping lengths of the mating grooves and lands on the valve sleeve 42 and the valve core 40, without significantly affecting the operation of the control valve 20. Such axial movement can be minimized by positioning the hitch pin 56 prior to final balancing of the control valve 20 so that the radially outermost part of the eccentric head portion 80 of the hitch pin is located on a line extending axially through the head axis 96 of the hitch pin. When the hitch pin 56 is rotated from such a position, the amount of axial movement of the hitch pin head portion 80 is smallest for a given amount of circumferential movement.

Once the control valve 20 is determined to be in a balanced condition, the hitch pin 56 is not rotated any further. The interlocking engagement between the threads 84 on the hitch pin and the threads 99 on the pinion 54, together with the thread locking material 110 on the body portion 82 of the hitch pin, retains the hitch pin permanently in the set position. The control valve 20 remains in the balanced condition.

Figure 5:
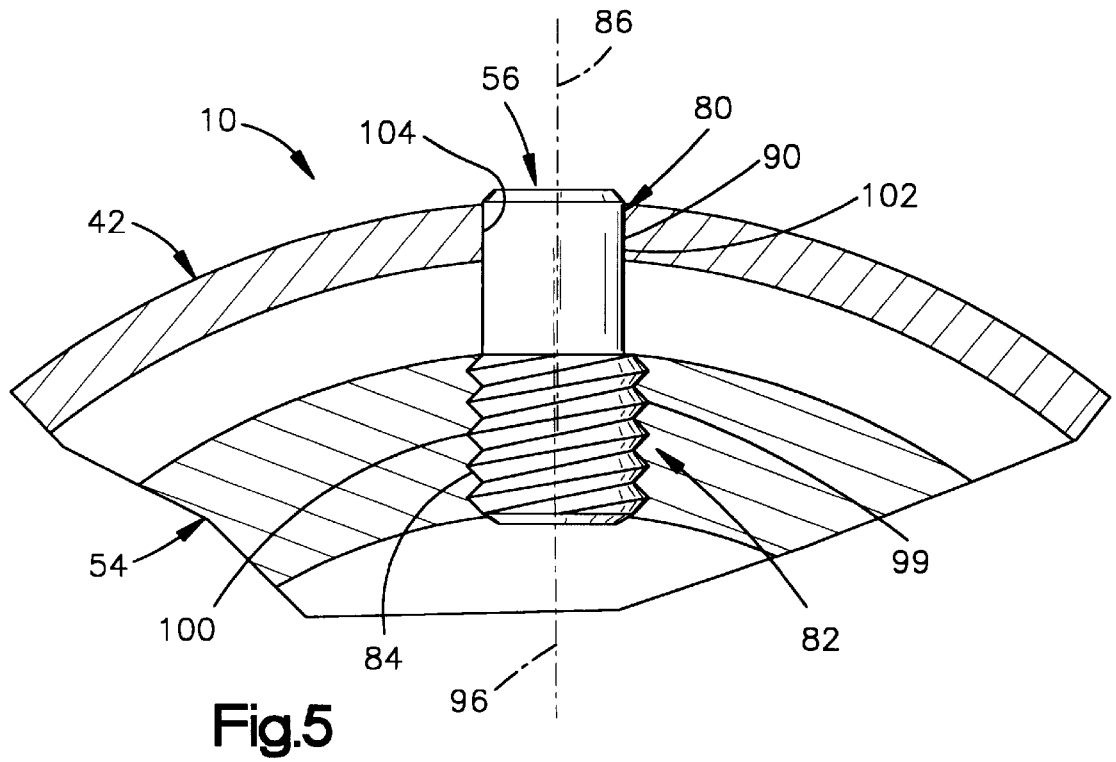
FIG. 5 is a fragmentary view showing the fastener in a first rotational position with the valve sleeve and the pinion in a first condition of relative rotation.
Figure 6:
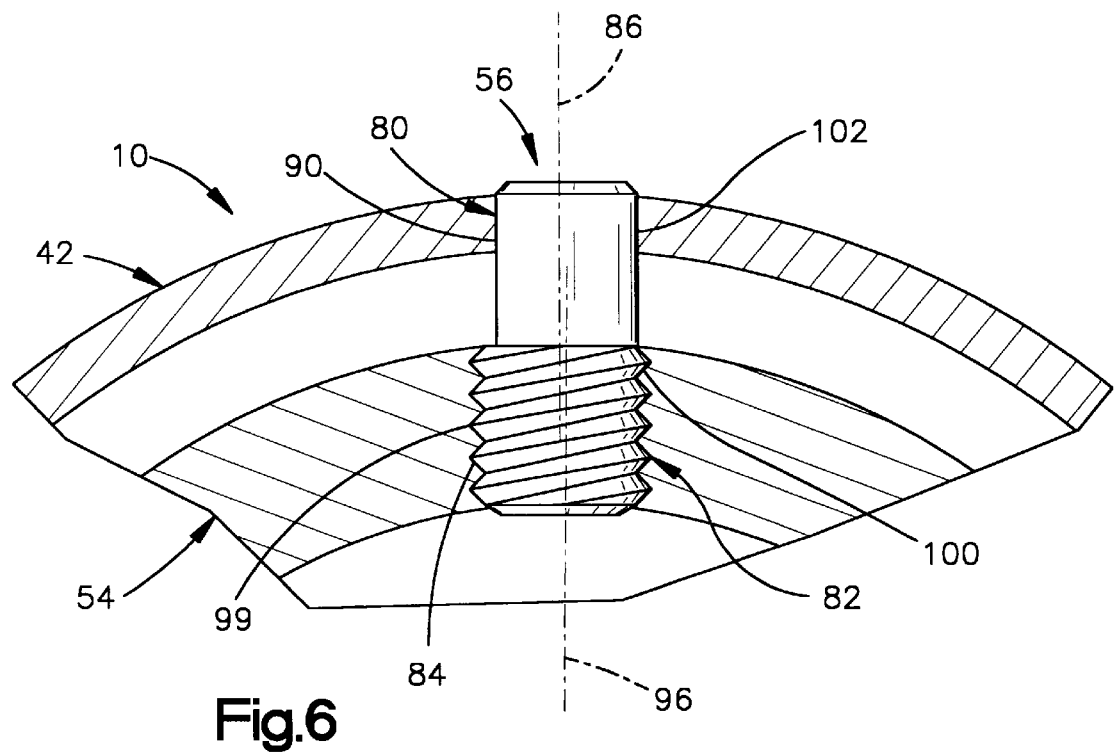
FIG. 6 is a view similar to FIG. 5 showing the fastener in a second rotational position with the valve sleeve and the pinion in a second condition of relative rotation.

In one embodiment, the hitch pin 56 is configured so that 90° of rotation of the hitch pin, around the thread axis 86 results in about 1° of circumferential movement of the valve sleeve 42 relative to the pinion 54. As an example, FIGS. 5 and 6 illustrate two different positions of the valve sleeve 42 and the pinion 54. In FIG. 5, the rotational position of the hitch pin 56 is such that the head portion 80 of the hitch pin is offset to the left as viewed in FIG. 5. As a result, the valve sleeve 42 is in a circumferentially counter-clockwise position relative to the pinion 54.

In FIG. 6, the hitch pin 56 is shown rotated 180° from the position of FIG. 5. The rotational position of the hitch pin 56 is such that the head portion 80 of the hitch pin is offset to the right as viewed in FIG. 5. The valve sleeve 42 is in a circumferentially clockwise position relative to the pinion, about 1° to 2° from the position shown in FIG. 5.

From the above description of the invention, those skilled in the art will perceive improvements, changes and modifications in the invention. Such improvements, changes and modifications within the skill of the art are intended to be covered by the appended claims.

Having described the invention, I claim:

1. A power rack and pinion steering gear comprising:

a rack;

a pinion meshing with said rack;

a power steering hydraulic motor for moving said rack;

first and second relatively rotatable valve parts which control hydraulic fluid pressure in said hydraulic motor and thereby control rack movement;

a rotatable input shaft connected with said first valve part, said first valve part rotating upon rotation of said input shaft, said pinion having an axially projecting first portion encircled by a second portion of said second valve part, said first portion of said pinion having an opening with threads;

a torsion bar connected between and acting between said input shaft and pinion; and means for connecting said first portion of said pinion to said second portion of said second valve part to cause said pinion and said second valve part to rotate together, said means for connecting being operable to rotate said second valve part relative to said pinion and said first valve part while said torsion bar is connected to said input shaft and to said pinion;

said means for connecting comprises a rotatable fastener having a threaded body portion screwed into said opening of said first portion of said pinion and having an eccentric head portion located in said second portion of said second valve part, rotation of said fastener relative to said pinion causing said eccentric head portion to rotate said second valve part relative to said first valve part; and said threaded body portion of said fastener having threads of a pitch different than the pitch of said threads in said opening in said first portion of said pinion to resist rotational movement of said fastener relative to said pinion.

2. A power steering gear as set forth in claim 1 wherein said eccentric head portion of said fastener has a cylindrical outer side surface centered on a first axis of said fastener, said threaded body portion of said fastener having a second axis offset from said first axis.

3. A power steering gear as set forth in claim 2 wherein said eccentric head portion of said fastener orbits about an axis of said threaded body portion during rotation of said fastener thereby causing said second valve part to rotate relative to said pinion and relative to said first valve part.

4. A power steering gear as set forth in claim 3 wherein about ninety degrees of rotation of said fastener results in about one degree of rotation of said second valve part relative to said first valve part.

5. A power steering gear as set forth in claim 4 wherein said eccentric head portion of said fastener having a hexagonal recess centered along said first axis of said fastener so that a hexagonal wrench may be inserted into said hexagonal recess in order to rotate said fastener about said second axis.

* * * * *